(12) United States Patent
Corazza et al.

(10) Patent No.: US 9,278,334 B2
(45) Date of Patent: Mar. 8, 2016

(54) NON-EVAPORABLE GETTER COMPOSITIONS WHICH CAN BE REACTIVATED AT LOW TEMPERATURE AFTER EXPOSURE TO REACTIVE GASES AT A HIGHER TEMPERATURE

(71) Applicant: SAES GETTERS S.P.A., Lainate (MI) (IT)

(72) Inventors: Alessio Corazza, Como (IT); Alessandro Gallitognotta, Origgio (IT); Vincenzo Massaro, Albairate (IT)

(73) Assignee: SAES GETTERS S.P.A., Lainate (MI) (IT)

( * ) Notice: Subject to any disclaimer, the term of this patent is extended or adjusted under 35 U.S.C. 154(b) by 30 days.

(21) Appl. No.: 14/237,454

(22) PCT Filed: Oct. 9, 2012

(86) PCT No.: PCT/IB2012/055441
§ 371 (c)(1),
(2) Date: Feb. 6, 2014

(87) PCT Pub. No.: WO2013/054251
PCT Pub. Date: Apr. 18, 2013

(65) Prior Publication Data
US 2014/0255715 A1    Sep. 11, 2014

(30) Foreign Application Priority Data

Oct. 14, 2011    (IT) .......................... MI2011A001870

(51) Int. Cl.
*B22F 1/00*    (2006.01)
*B01J 20/28*    (2006.01)
*H01J 7/18*    (2006.01)
*B01J 20/02*    (2006.01)

(52) U.S. Cl.
CPC ............ *B01J 20/28004* (2013.01); *B01J 20/02* (2013.01); *H01J 7/183* (2013.01); *Y10T 428/12014* (2015.01)

(58) Field of Classification Search
None
See application file for complete search history.

(56) References Cited

U.S. PATENT DOCUMENTS

| 3,203,901 A | 8/1965 | Porta |
| 3,926,832 A | 12/1975 | Barosi |

(Continued)

FOREIGN PATENT DOCUMENTS

| EP | 0719609 | 7/1996 |
| EP | 1537250 | 6/2005 |

(Continued)

OTHER PUBLICATIONS

"Ammonium Oxalate", U.S. National Library of Medicine, accessed Nov. 9, 2015, http://pubchem.ncbi.nlm.nih.gov/compound/ammonium_oxalate#section=Information-Sources.*

(Continued)

*Primary Examiner* — Humera Sheikh
*Assistant Examiner* — Seth Dumbris
(74) *Attorney, Agent, or Firm* — Steinfl & Bruno LLP

(57) ABSTRACT

Compositions containing a mixture of non-evaporable getter alloys are described. The compositions, after having lost their functionality in consequence of the exposure to reactive gases at a first temperature, can then be reactivated through a thermal treatment at a second temperature that is lower than the first one.

9 Claims, 1 Drawing Sheet

(56) References Cited

U.S. PATENT DOCUMENTS

| | | | |
|---|---|---|---|
| 4,071,335 A | 1/1978 | Barosi | |
| 4,312,669 A | 1/1982 | Boffito et al. | |
| 4,668,424 A | 5/1987 | Sandrock | |
| 4,839,085 A | 6/1989 | Sandrock et al. | |
| 5,180,568 A | 1/1993 | Boffito et al. | |
| 5,882,727 A | 3/1999 | Corazza et al. | |
| 5,961,750 A | 10/1999 | Boffito et al. | |
| 5,976,723 A | 11/1999 | Boffito et al. | |
| 6,521,014 B2 | 2/2003 | Toia et al. | |
| 7,413,814 B2 * | 8/2008 | Conte et al. | 428/613 |
| 7,727,308 B2 | 6/2010 | Coda et al. | |
| 2007/0037007 A1 * | 2/2007 | Conte et al. | 428/660 |

FOREIGN PATENT DOCUMENTS

| | | |
|---|---|---|
| GB | 2077487 | 12/1981 |
| WO | 95/23425 | 8/1995 |
| WO | 2004/024965 | 3/2004 |

OTHER PUBLICATIONS

International Search Report mailed on Feb. 7, 2013 for PCT/IB2012/055441 filed on Oct. 9, 2012 in the name of SAES GETTERS S.P.A.
Written Opinion mailed on Feb. 7, 2013 for PCT/IB2012/055441 filed on Oct. 9, 2012 in the name of SAES GETTERS S.P.A.

* cited by examiner

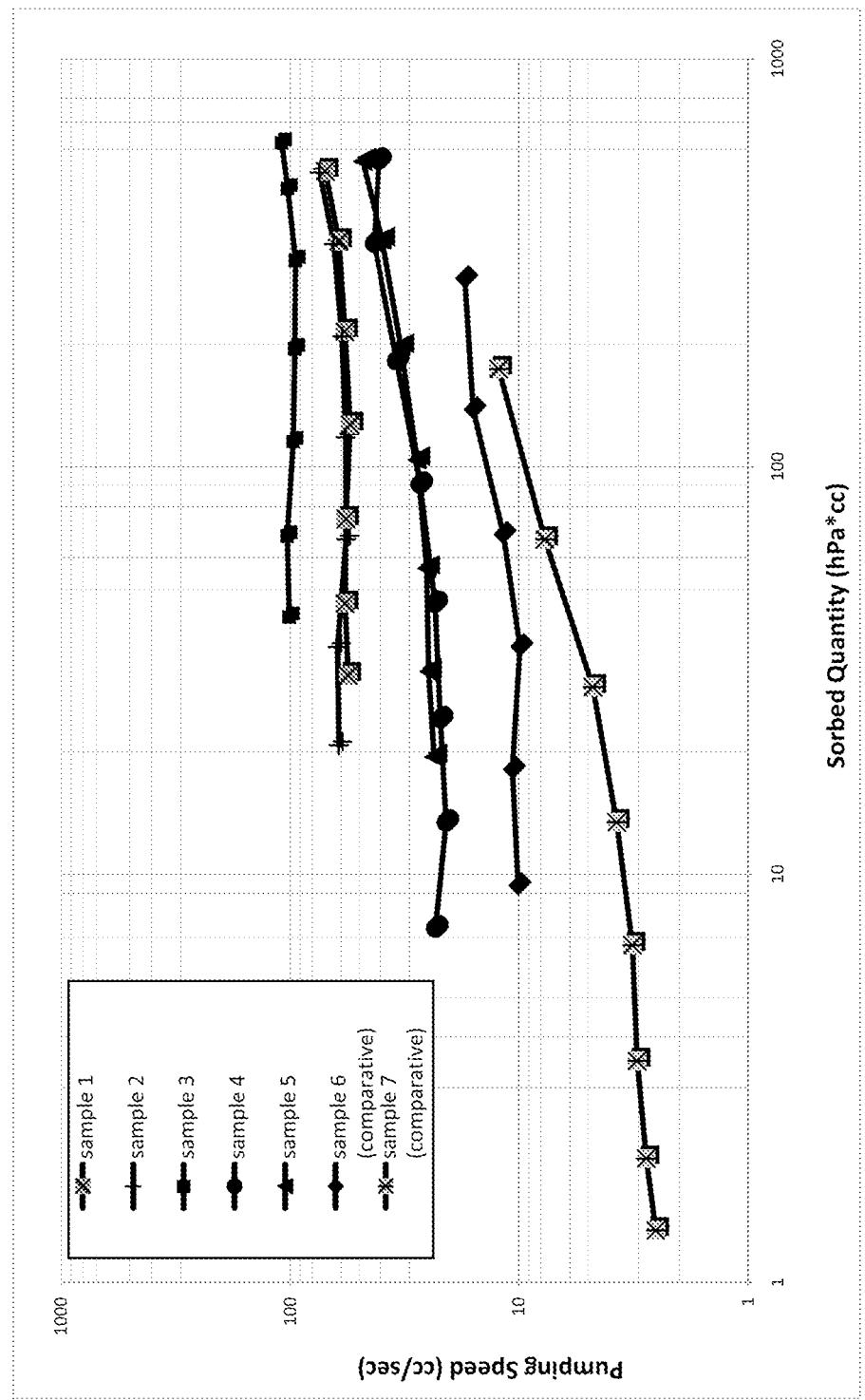

NON-EVAPORABLE GETTER COMPOSITIONS WHICH CAN BE REACTIVATED AT LOW TEMPERATURE AFTER EXPOSURE TO REACTIVE GASES AT A HIGHER TEMPERATURE

CROSS REFERENCE TO RELATED APPLICATIONS

The present application is the U.S. national stage of International Patent Application PCT/IB2012/055441 filed on Oct. 9, 2012 which, in turn, claims priority to Italian Patent Application MI2011A001870 filed on Oct. 14, 2011.

The present invention is directed to compositions containing non-evaporable getter alloys which, after having lost their functionality as a consequence of an exposure to reactive gases at a first temperature, can then be reactivated by means of a thermal treatment at a second temperature, lower than the first one.

Non-evaporable getter alloys, also known as NEG alloys, can sorb reversibly hydrogen and irreversibly gases such as oxygen, water, carbon oxides, hydrocarbons and, in the case of some alloys, nitrogen.

These alloys are employed in a number of industrial applications which require the maintenance of vacuum in sealed systems: examples of these applications are the particle accelerators, the X-rays generating tubes, the displays formed of cathode ray tubes or CRTs, the flat displays of the field-emission type (called FEDs), the evacuated jackets for the thermal insulation such as those used in thermal bottles (thermos), Dewar bottles and pipes for the oil extraction and transportation, the evacuated jackets of high intensity discharge lamps and vacuum insulated glasses.

NEG alloys can be also employed to remove the above-mentioned gases when traces thereof are present in other gases, generally noble gases or nitrogen. An example is the use in gas filled lamps, particularly fluorescent lamps which are filled with noble gases at pressures ranging from a few hectoPascal (hPa) to some tens of hectoPascal, wherein the NEG alloy has the function of removing traces of oxygen, water vapour, hydrogen and other gases so as to keep a suitably clean atmosphere for the proper lamp operation; another example is the use in plasma displays, wherein the function of the NEG alloy is substantially similar to the one carried out in fluorescent lamps; another example is the use of a NEG alloy to remove traces of gaseous impurities for the purification of gases, such as noble gases and nitrogen, employed in the semiconductor field.

These alloys have generally as main components zirconium and/or titanium and comprise one or more additional elements selected among the transition metals, Rare Earths or aluminum.

The functioning principle of NEG alloys is the reaction among the metallic atoms on the alloy surface and the absorbed gases, in consequence of which a layer of oxides, nitrides or carbides of the metals is formed on that surface. When surface coverage is complete, the alloy is inactive for further absorptions: its function can be restored through a reactivation treatment, at a temperature which is at least the same and preferably higher than the working temperature for a sufficiently long time to have a diffusion of the adsorbed layer into the alloy bulk and to create again a clean and active surface. Activation temperature of a getter alloy is defined as the minimum temperature necessary for the alloy to obtain at least a partially active surface and to start the sorption of active gases within some tens of seconds.

Non-evaporable getter alloys can be classified in two main sub-groups. NEG alloys requiring an activation temperature higher than 450° C. are usually named as "high activation temperature alloys" or simply as "high temperature getter alloys" whereas NEG alloys requiring an activation temperature lower than 450° C. are identified as "low activation temperature alloys" or simply as "low temperature getter alloys". Because of the definition of "activation temperature", low temperature getter alloys can be activated also by using temperatures higher than 450° C.: in these conditions they are characterized in becoming activated in a very short time with respect to that required for high temperature getters alloys; for example, depending on the applied high temperature, they can be activated in a time that is between 3 and 30 times shorter than for high temperature alloys.

As examples of high temperature getter alloys, U.S. Pat. No. 3,203,901 discloses Zr—Al alloys and U.S. Pat. No. 4,071,335 discloses Zr—Ni alloys.

On the other hand, as examples of low temperature getter alloys, U.S. Pat. No. 4,312,669 discloses Zr—V—Fe alloys, U.S. Pat. No. 4,668,424 discloses zirconium-nickel-mischmetal alloys with the optional addition of one or more other transition metals; U.S. Pat. No. 4,839,085 discloses Zr—V—E alloys, wherein E is an element selected among iron, nickel, manganese and aluminum or a mixture thereof; U.S. Pat. No. 5,180,568 discloses intermetallic compounds Zr—M'—M", wherein M' and M", being identical or different from one another, are selected among Cr, Mn, Fe, Co and Ni, U.S. Pat. No. 5,961,750 discloses Zr—Co—A alloys wherein A is an element selected among yttrium, lanthanum, Rare Earths or a mixture thereof, U.S. Pat. No. 6,521,014 discloses zirconium-vanadium-iron-manganese-mischmetal alloys, and U.S. Pat. No. 7,727,308 discloses Zr—Y—M compositions wherein M is selected among Al, Fe, Cr, Mn, V.

NEG alloys are used alone or in a mixture with a second component, generally a metal, capable of granting to a body formed with the alloy particular characteristics, such as a higher mechanical strength. The most common mixtures with metals are compositions comprising Zr—V—Fe or Zr—Al alloys and zirconium or titanium as described respectively in the patents GB 2,077,487 and U.S. Pat. No. 3,926,832, while U.S. Pat. No. 5,976,723 describes compositions containing aluminum and a NEG alloy of formula $Zr_{1-x}$—$Ti_x$—M'—M", wherein M' and M" are metals selected among Cr, Mn, Fe, Co and Ni, and x is comprised between 0 and 1.

One important issue occurring in some cases, is that it is impossible to treat an alloy for its activation or reactivation at a temperature higher than that at which it has been previously exposed to gases during the fabrication of devices. It is in particular the case of alloys which are used in devices wherein the space to be kept under vacuum or controlled atmosphere is defined by walls made of glass. The manufacturing of these devices generally requires the getter alloy being inserted in its final position when the device is still open and its inner space is exposed to the atmosphere; thereafter, the device is sealed through a so-called "frit-sealing" step, wherein between two glass portions to be welded together a low-melting glass paste is placed which, brought to about 400-420° C., melts, thus joining the two portions.

The vacuum or the controlled atmosphere can be obtained in the inner space of the device before sealing (in the so-called "in chamber" processes, wherein the device assembling steps are carried out in an enclosure under vacuum or controlled atmosphere) or, more commonly, after the frit-sealing, by means of a "tail", i.e. a small glass tubulation admitting to said space and suitable for connection to a pumping system; in case of devices containing a controlled atmosphere, such as the plasma displays and some lamps, the tail is used also for the filling with the desired gases after air removal; finally the device is sealed by closing the tail, usually by heat compression.

In any case, during frit-sealing, the NEG alloy is exposed to an atmosphere of reactive gases, being the gases released by the low-melting glass paste in case of "in chamber" processes, and these same gases plus the atmospheric gases in case of "tail" processes. The contact between the alloy and the reactive gases occurs at a temperature depending on the process: the device can be homogeneously brought to the frit-sealing temperature within a furnace, in which case the NEG alloy will be exposed to the reactive gases at a temperature of about 400-420° C.; alternatively it is possible to use a localized heating, e.g. by irradiation, in which case the getter temperature during the operation depends on its distance from the frit-sealing zone.

In any case, during these operations the NEG alloy surface reacts with more or less intensity with the gases being present, with consequent at least partial deactivation of the alloy, such that the residual sorption velocity and capacity may result insufficient for the foreseen operation in the device; therefore there would be required a reactivation treatment at a temperature at least equal to, or preferably higher than that of frit-sealing, which is however generally impossible, both to prevent a re-melting of the frit-sealing paste which would endanger the welding seal and to avoid impairment of the mechanical stability of the glassy portions forming the walls of the device containing the getter.

In other cases, such as in most of the discharge lamps manufacturing, the getter alloy is inserted in its final position when the device is still in air and the glass portions are sealed by means of glass melting (the so called glass sealing); thereafter, the device is evacuated by means of a small glass tubulation present in the structure, after its connection to a pumping system. During the glass sealing process the getter alloy can achieve temperatures in the range of 400-450° C. in the presence of air and of other reactive gases with consequent passivation and deactivation of the alloy.

EP 1537250 describes getter compositions reactivatable by treatment at a temperature lower than that of a previous exposure to reactive gases, formed of a mixture of powders of a first component being titanium or a mixture of titanium and at least one of nickel and cobalt, with a second component being a non-evaporable getter alloy comprising zirconium, vanadium, iron, and at least one further component chosen between manganese and one or more elements selected among yttrium, lanthanum and Rare Earths. Even if those mixtures have been found to be completely reactivatable in terms of carbon monoxide sorption properties, they have shown a limited capability to be reactivated to absorb other gas, as for example hydrogen.

It is an object of the present invention to provide compositions containing non-evaporable getter alloys that, after having lost their functionality in consequence of an exposure to reactive gases at a first temperature, can then be reactivated through a thermal treatment at a second temperature which is lower than the first one and without the limits in the sorption properties characterizing the compositions described in the prior art.

This object is achieved according to the present invention with getter compositions containing a mixture of powders of two different components, said components consisting in non-evaporable getter alloys, characterized in that the first of said two components consists in a non-evaporable getter alloy having high-activation temperature, the second component consists in a non-evaporable getter alloy having low-activation temperature and the weight ratio between said first and said second component is greater than 1:4 and lower than 7:3.

The inventors have found that the compositions of the invention, contrary to the NEG alloys alone and to the known compositions of a NEG alloy with one or more metals, can be exposed to reactive gases (such as atmospheric gases) at relatively high temperatures, e.g. about 400-450° C. that is required for the welding by frit-sealing of glassy portions or for direct glass sealing, and then can be fully reactivated, recovering good sorption properties for the active gases, by a thermal treatment at a lower temperature, such as not to endanger the seal of the glassy welding or the mechanical strength of the glass portions which are close to the composition. The compositions of the invention have a limited interaction with the active gases present during the sealing process and then maintain a higher residual capacity to sorb gases.

BRIEF DESCRIPTION OF THE DRAWINGS

FIG. 1 shows the sorption curves for $H_2$ at 400° C. for the seven samples described in Examples 1-7.

The invention will be described in the following with reference to FIG. 1 in which the sorption curves for $H_2$ at 400° C. of some compositions of the invention are compared with those of the compositions of the prior art when reactivated after exposure to reactive gases.

The NEG alloys used in the compositions as non-evaporable getter alloy having high activation temperature can be, for example, Zr-based or Ti-based alloys with particular reference to zirconium binary alloys as Zr—Ni and Zr—Al, titanium binary alloys as Ti—Ni or zirconium ternary alloys as Zr—Ni—X and Zr—Al—X, wherein the third metallic element contents is lower than 10% with respect to the total weight of the getter alloy mixture. In order to obtain compositions according to the present invention, the high temperature activation non-evaporable getter alloy is characterized in having an activation temperature higher than 450° C. and it is generally employed in the form of powders, having a particle size lower than 220 μm, and preferably lower than 130 μm.

The NEG alloys used in the compositions as non-evaporable getter alloy having low activation temperature can be, for example, Zr-based alloys with particular reference to Zr—Co—A alloys wherein A is an element selected among yttrium, lanthanum, Rare Earths or a mixture thereof, Zr—Fe—Y alloys, Zr—V—Fe alloys and Zr—V—Fe—Mn-MischMetal alloys. In order to obtain compositions according to the present invention, the low temperature activation non-evaporable getter alloy is characterized in having an activation temperature lower than 450° C. These alloys are generally employed in the form of powders, having a particle size lower than 250 μm, and preferably lower than 210 μm.

According to the present invention, the weight ratio between the high temperature NEG alloy and the low temperature NEG alloy is comprised within about 1:4 and 7:3, preferably within about 3:7 and 3:2, even more preferably in a ratio of about 2:3.

The compositions of the invention have shown good $H_2$ sorption properties after reactivation following the exposure to the reactive gas. As secondary unexpected result that can be added to the hydrogen removal properties, moreover, they have shown high sorption capabilities and sorption speed of other gases (i.e. methane or oxygenated gases). The compositions can be used to produce getter devices of various shapes, having or not a support.

A possible way to use the compositions of the present invention is to make getter devices or elements in the form of pellets obtained by compression, pouring the mixture of powders into a suitable mould and compressing the same by a suitable punch, with values of pressure applied generally higher than 3000 Kg/cm². Compression may be followed by a sintering step, wherein the pellet undergoes a thermal treatment at temperatures comprised between about 700 and 1000° C. under vacuum or inert atmosphere. While in the case of compression only the getter devices have generally the shape of a pellet, when also sintering is carried out, which increases the mechanical resistance of the finished body, also other shapes can be obtained, such as relatively thin tablets.

As an interesting alternative, the getter device comprises powders of the compositions according to the invention supported on a suitable mechanical substrate, generally of metal. The substrate can be a metallic strip or sheet, in which case the powders of the composition can be deposited by cold rolling or screen-printing followed by sintering; cold rolling is a well known technique in the field of powders metallurgy, whereas the production of deposits of getter material by screen-printing is disclosed in U.S. Pat. No. 5,882,727. The substrate can also be a container of various shapes, provided with at least an open portion through which the composition of the invention can come into contact with the space from which the gaseous impurities have to be removed, such as a short cylinder wherein the mixture of powders is poured and in which thereafter said mixture is compressed by a suitable punch. In case the composition of the invention is introduced in a container, sintering is generally not required. An alternative structure is a filiform structure created by bending a long and narrow metallic substrate in order to envelope and wrap the powders of the invention with the exception of a longitudinal slit to favor the gas sorption.

In a second aspect, the present invention consists in a sensitive system with a getter device obtained by use of a getter composition containing a mixture of powders of two different components, said components consisting in non-evaporable getter alloys, characterized in that the first of said two components consists in a non-evaporable getter alloy having a high activation temperature, the second component consists in a non-evaporable getter alloy having a low activation temperature and the weight ratio between said first and said second component is greater than 1:4 and lower than 7:3. Examples of sensitive systems that can be improved with the present invention are, in a non-limiting list, particle accelerators, X-rays generating tubes, displays formed of cathode ray tubes or CRTs, flat displays of the field-emission type (called FEDs), evacuated jackets for the thermal insulation such as those used in thermal bottles (thermos), Dewar bottles and pipes for the oil extraction and transportation, the evacuated jackets of high-intensity discharge lamps and vacuum-insulated glasses or gas-filled lamps.

The invention will be further illustrated by the following examples. These non-limiting examples show some embodiments designed to teach those skilled in the art how to practice the invention and to represent the best considered way to carry out the invention itself.

EXAMPLE 1

A sample according to a composition of the invention was prepared by mixing powder of the high activation temperature alloy Zr 86%-Al 14% wt with powder of the low activation temperature alloy Zr 70%-Fe 15%-Y 15% wt in a 2:3 ratio; grain size of the powders was comprised between 0 and 125 μm for both alloys. Then 120 mg of the mixture were pressed with a pressure of about 4000 Kg/cm² in a suitable annular container and the sample was heated in air at 420° C. for about 1 minute.

Finally a sorption test with $H_2$ was carried on the sample at 400° C. dosing, in static conditions, hydrogen with an initial pressure of 0,133 hPa in the getter chamber having a volume of about 5000 cm³ (also indicated as "cubic centimeters" or "cc"), after activation at 400° C. for 1 minute.

EXAMPLE 2

A sample according to a composition of the invention was prepared by mixing powder of the high activation temperature alloy Zr 76%-Ni 24% wt with powder of the low activation temperature alloy Zr 70%-Fe 15%-Y 15% wt in a 2:3 ratio; grain size of the powders was comprised between 0 and 125 μm for both alloys. Then a sample was prepared and tested according to example 1.

EXAMPLE 3

A sample according to a composition of the invention was prepared by mixing powder of the high activation temperature alloy Zr 79.2%-Ni 21.8% wt with powder of the low activation temperature alloy Zr 70%-Fe 15%-Y 15% wt in a 2:3 ratio; grain size of the powders was comprised between 0 and 125 μm for both alloys. Then a sample was prepared and tested according to example 1.

EXAMPLE 4

A sample according to a composition of the invention was prepared by mixing powdes of the high activation temperature alloy Zr 86%-Al 14% wt with powder of the low activation temperature alloy Zr 70%-V 24.6%-Fe 5.4% wt in a 2:3 ratio; grain size of the powders was comprised between 0 and 125 μm for both alloys. Then a sample was prepared and tested according to example 1.

EXAMPLE 5

A sample according to a composition of the invention was prepared by mixing powder of the high activation temperature alloy Zr 76%-Ni 24% wt with powder of the low activation temperature alloy Zr 80.8%-Co 14.2% Rare Earths 5.0% wt in a 2:3 ratio; grain size of the powders was comprised between 0 and 125 μm for both alloys. Then a sample was prepared and tested according to example 1.

EXAMPLE 6 (COMPARATIVE)

A sample was prepared by mixing powder of the element Ti with powder of the low activation temperature alloy Zr 70%-V 24.6%-Fe 5.4% wt in a 2:3 ratio; grain size of the powders was comprised between 0 and 125 μm for both alloys. Then a sample was prepared and tested according to example 1.

EXAMPLE 7 (COMPARATIVE)

A sample was prepared by mixing powder of the element Ti with powder of the low activation temperature alloy Zr 70%-V 15%-Fe 3.3%-Mn 8.7%-MM 3% wt in a 2:3 ratio; grain size of the powders was comprised between 0 and 125 μm for both alloys. Then a sample was prepared and tested according to example 1.

The sorption curves (shown in FIG. 1) were obtained for the different getter samples after passivation of their materials at 420° C. for a short time in order to simulate the glass sealing conditions: it is evident that the samples of the compositions according to the invention are much better than the comparative samples in terms of hydrogen removal from the test chamber.

The invention claimed is:

1. A getter composition consisting of a mixture of powders of two different components, said components consisting of non-evaporable getter alloys, wherein
    the first of said two components consists of at least one non-evaporable getter alloy having a high activation temperature,
    the second component consists of at least one non-evaporable getter alloy having a low activation temperature, and
    the weight ratio between said first and said second component is greater than 1:4 and lower than 7:3.

2. The getter composition according to claim 1, wherein the non-evaporable getter alloy having a high activation temperature is selected among binary and ternary Zr-based or Ti-based alloys or mixtures thereof.

3. The getter composition according to claim 2, where the Zr—based or Ti-based alloys are selected among Zr—Al, Zr—Ni, Ti—Ni, Zr—Al—X, Zr—Ni—X alloys or mixtures thereof.

4. The getter composition according to claim 1, wherein the non-evaporable getter alloy having a low activation temperature consists of Zr—based alloys selected among Zr—Fe—Y alloys, Zr—V—Fe alloys, Zr—V—Fe—Mn—MischMetal alloys and Zr—Co—A alloys wherein A is an element selected among yttrium, lanthanum, Rare Earths or mixtures thereof.

5. A getter device containing the getter composition according to claim 1.

6. A system containing the getter device according to claim 5, said system being selected among particle accelerators, X-rays generating tubes, displays formed of cathode ray tubes (CRTs), field emission flat displays, and vacuumed jackets for thermal insulation.

7. The system according to claim 6, wherein the vacuumed jackets for thermal insulation are selected among a group comprising jackets for use in thermal bottles (thermos), Dewar bottles and pipes for oil extraction and transportation, high-intensity discharge lamps, and vacuum-insulated glasses or gas-filled lamps.

8. The getter composition according to claim 1, wherein the grain size is respectively smaller than 125 μm and 210 μm.

9. The getter composition of claim 1, wherein said first and said second components are used in the form of powders with grain size respectively smaller than 230 μm and 250 μm.

* * * * *